United States Patent
Shin et al.

(10) Patent No.: US 8,384,315 B2
(45) Date of Patent: Feb. 26, 2013

(54) IMAGE FORMING APPARATUS, MOTOR CONTROL APPARATUS, AND MOTOR CONTROL METHOD

(75) Inventors: Seong-ho Shin, Yongin-si (KR); Young-jung Yun, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 345 days.

(21) Appl. No.: 12/713,279

(22) Filed: Feb. 26, 2010

(65) Prior Publication Data

US 2011/0062900 A1 Mar. 17, 2011

(30) Foreign Application Priority Data

Sep. 15, 2009 (KR) .................. 10-2009-0087069

(51) Int. Cl.
*H02P 5/00* (2006.01)

(52) U.S. Cl. .. 318/51; 318/34; 318/400.38; 318/400.37; 318/400.01

(58) Field of Classification Search ............ 318/51, 318/34, 400.38, 400.37, 400.01, 700
See application file for complete search history.

(56) References Cited

U.S. PATENT DOCUMENTS

| | | | | |
|---|---|---|---|---|
| 5,592,261 | A * | 1/1997 | Yoshino | 399/167 |
| 6,278,857 | B1 * | 8/2001 | Monji et al. | 399/301 |
| 6,949,900 | B1 * | 9/2005 | Berringer | 318/400.03 |
| 6,979,976 | B2 * | 12/2005 | Tachibana | 318/400.09 |
| 7,400,105 | B2 * | 7/2008 | Sugimoto et al. | 318/400.14 |
| 7,443,114 | B2 * | 10/2008 | Kato | 318/69 |
| 2010/0001670 | A1 * | 1/2010 | Scalese | 318/400.09 |

FOREIGN PATENT DOCUMENTS

| | | |
|---|---|---|
| JP | 2003-202719 | 7/2003 |
| JP | 2003-348892 | 12/2003 |

* cited by examiner

*Primary Examiner* — Walter Benson
*Assistant Examiner* — David Luo
(74) *Attorney, Agent, or Firm* — Stanzione & Kim, LLP

(57) ABSTRACT

An image forming apparatus includes an engine unit to perform an image forming job, an engine control unit to control operation of the engine unit, a plurality of brushless direct current (BLDC) motors to operate the engine unit, a communication interface unit to receive a digital control command for the plurality of brushless DC motors from the engine control unit, a sensor unit to sense operation information of the plurality of brushless DC motors, an operation signal unit to generate an operation signal to control the plurality of brushless DC motors, and a speed control unit to control operation of the operation signal unit according to the received digital control command and sensing result of the sensor unit.

24 Claims, 4 Drawing Sheets

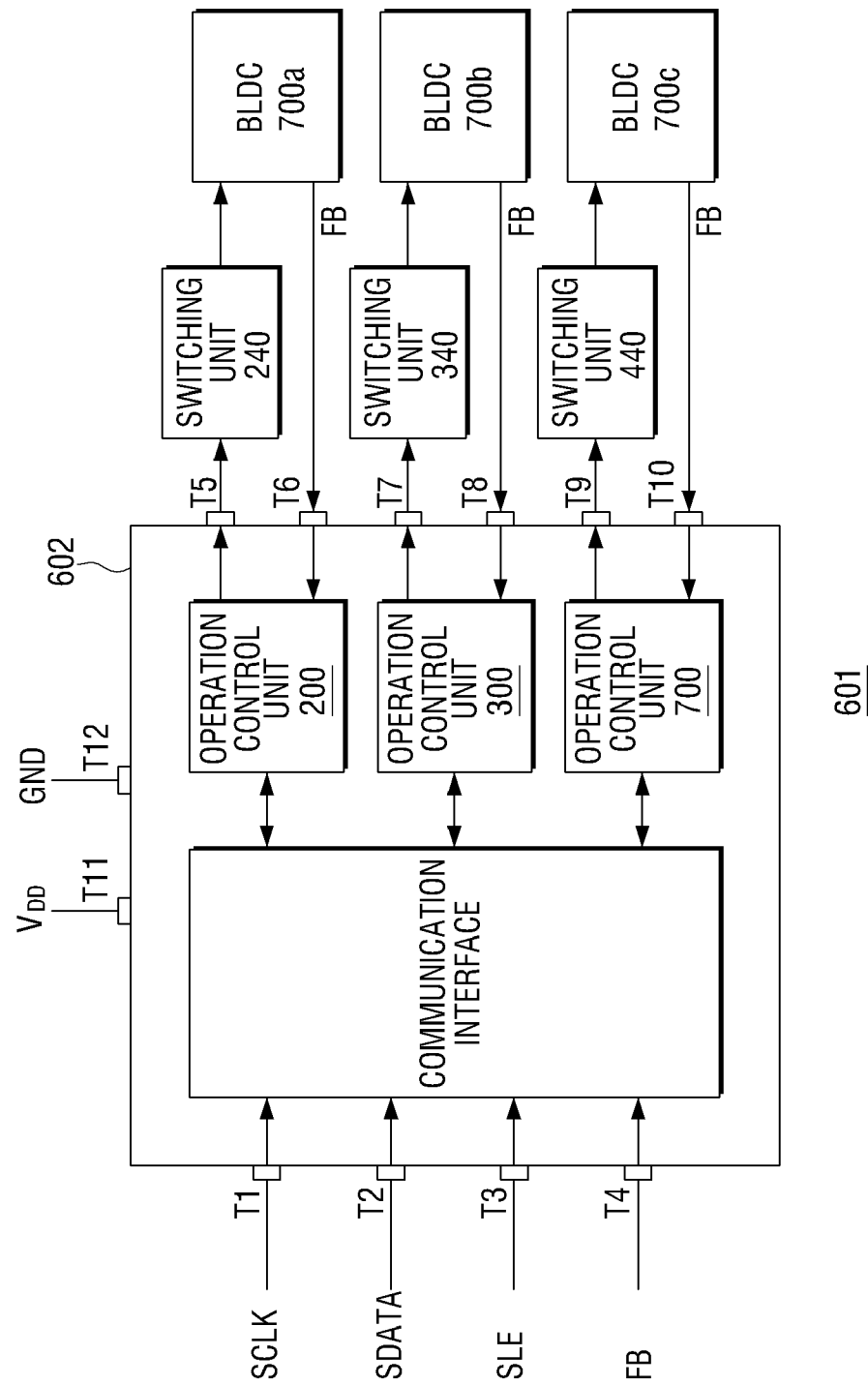

IMAGE FORMING APPARATUS, MOTOR CONTROL APPARATUS, AND MOTOR CONTROL METHOD

CROSS-REFERENCE TO RELATED APPLICATIONS

This application claims priority under 35 U.S.C. §119 (a) from Korean Patent Application No. 10-2009-0087069, filed on Sep. 15, 2009, in the Korean Intellectual Property Office, the disclosure of which is incorporated herein by reference in its entirety.

BACKGROUND

1. Field of the Invention

The present general inventive concept relates to an image forming apparatus, a motor control apparatus, and a motor control method. More particularly, the present general inventive concept relates to an image forming apparatus capable of efficiently controlling a plurality of brushless direct current (BLDC) motors, a motor control apparatus, and a motor control method.

2. Description of the Related Art

Image forming apparatuses are apparatuses to generate, print, receive and transmit image data, which include printers, scanners, photocopiers, fax machines, and multifunction peripherals incorporating these functions.

Such image forming apparatuses use motors to perform diverse functions, for example, to move or feed printing paper. As option units such as auto document feeders (ADFs), finishers, high capacity feeders (HCFs), and double capacity feeders (DCF) may be attached to image forming apparatuses, the number of motors which may be used in image forming apparatuses are gradually increased.

Recently, in order to prevent noise generated when operating image forming apparatuses, brushless direct current (BLDC, or brushless DC) motors have been generally used. A brushless DC motor is a motor which has no brush in a DC motor and electronically performs commutation. Since there are no mechanical contacts between a brush and a commutator, high speed and long life span are enabled and noise is reduced.

Since such brushless DC motors have no brush, operation circuits are used to sense a rotor's position using a Hall sensor and to control the brushless DC motors by sequentially supplying power to each brushless DC motor.

However, in related art, to control a plurality for brushless DC motors, operation circuits are provided to correspond to the number of brushless DC motors. Accordingly, a plurality of components are needed, an assembly time becomes longer, and more space is needed on a printed circuit board to fit a plurality of components.

SUMMARY

The present general inventive concept provides an image forming apparatus capable of efficiently controlling a plurality of brushless direct current (BLDC, or brushless DC) motors, a motor control apparatus, and a motor control method.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus including an engine unit to perform an image forming job, an engine control unit to control operation of the engine unit, a plurality of brushless direct current (BLDC) motors to operate the engine unit, a communication interface unit to receive a digital control command for the plurality of brushless DC motors from the engine control unit, a sensor unit to sense operation information of the plurality of brushless DC motors, an operation signal unit to generate an operation signal to control the plurality of brushless DC motors, and a speed control unit to control operation of the operation signal unit according to the received digital control command and sensing result of the sensor unit.

The foregoing and/or other aspects and utilities of the present general inventive concept may be achieved by providing a motor control apparatus including a plurality of brushless direct current (BLDC) motors, a communication interface unit to receive a digital control command for the plurality of brushless DC motors, and an operation control unit to control the plurality of brushless DC motors according to the received digital control command.

The operation control unit may include an operation signal unit to generate an operation signal to control the plurality of brushless DC motors, and a speed control unit to control the operation signal unit according to the received digital control command.

The operation control unit may further include a sensor unit to sense operation information of each of the brushless DC motors, and the speed control unit may receive the operation information and perform feedback control according to the operation information.

The sensor unit may include a rotor position sensing unit to receive information regarding a rotor's position from a Hall sensor attached to each of the brushless DC motors, and a speed sensor unit to receive information regarding a rotation speed of each of the brushless DC motors.

The operation control unit may control the brushless DC motors individually.

The operation control unit may control each of the brushless DC motors in the same manner as each other brushless DC motor.

The communication interface unit may receive the digital control command through a Serial Peripheral Interface (SPI), a universal asynchronous receiver/transmitter (UART), or an Inter-Integrated Circuit (I²C).

The digital control command may include information regarding start/stop of rotation, acceleration/reduction, direction of rotation, rotation speed, or operation of a brake for the brushless DC motors.

There may be a plurality of operation control units corresponding to the plurality of brushless DC motors, respectively, and the communication interface unit may transmit the digital control command to a corresponding one of the plurality of operation control units.

The motor control apparatus may further include a step motor and a direct current (DC) motor, and the operation control unit may control the plurality of brushless DC motors and at least one of the step motor and the DC motor.

The communication interface unit and the operation control unit may be integrated into a single chip.

The foregoing and/or other aspects and utilities of the present general inventive concept may be achieved by providing a method of controlling a plurality of brushless direct current (BLDC) motors, the method including receiving a digital control command for the plurality of brushless DC motors, reading out a control signal for the plurality of brushless DC motors from the received digital control command, and generating an operation signal for the plurality of brushless DC motors according to the read-out control signal.

The method may further include receiving operation information of each of the brushless DC motors, and controlling the operation signal according to the operation information.

The operation information may be at least one of information regarding a rotor's position of each of the brushless DC motors, and information regarding a rotation speed of each of the brushless DC motors.

In the generating of the operation signal, the operation signal may be generated for each of the brushless DC motors.

In the generating of the operation signal, the same operation signal may be generated for the plurality of brushless DC motors.

In the generating of the operation signal, the operation signal may be generated for the plurality of brushless DC motors and for at least one of a step motor and a direct current (DC) motor.

Features and/or utilities of the present general inventive concept may also be realized by a motor control apparatus including a communication interface to receive a control signal and to extract destination data from the control signal and at least one operation control unit to receive the control signal from the communication interface and to output an operation command to at least one brushless DC motor of a plurality of brushless DC motors capable of receiving operation commands from the at least one operation control unit. The at least one operation control unit may correspond to the destination data extracted from the control signal by the communication interface.

The control signal may include only three control signals corresponding to a clock signal, a data signal, and a XXXX (SLE function) signal to control each of the plurality of brushless DC motors.

The at least one operation control unit may include a plurality of operation control units, each operation control unit corresponding to at least one respective brushless DC motor.

The at least one operation control unit may include an operation signal unit to generate the operation command to control the plurality of brushless DC motors and a speed control unit to receive the control signal from the communication interface and to control the operation signal unit according to the received control signal.

The motor control apparatus may further include a plurality of switching units to correspond to the plurality of brushless DC motors, respectively.

The at least one switching unit of the plurality of switching units may receive the operation command from the operation control unit and outputs driving signals to drive at least one brushless DC motor of the plurality of brushless DC motors.

The operation command may include a plurality of operation commands corresponding to the plurality of brushless DC motors and each switching unit may receive a different one of the plurality of operation commands and outputs different driving signals to the plurality of brushless DC motors, respectively, corresponding to the different operation commands.

The motor control apparatus may further include a feedback circuit to sense operation information of each of the brushless DC motors, and the at least one operation control unit may receive the operation information from each of the brushless DC motors and adjusts the output operation command accordingly.

Features and/or utilities of the present general inventive concept may also be realized by an application-specific integrated circuit (ASIC) including a communication interface including at least one communication terminal and circuitry to receive a control signal from the communication terminal and at least one operation control circuit to receive the control signal from the communication interface and to output an operation command to at least one brushless DC motor of a plurality of brushless DC motors capable of receiving operation commands from the at least one operation control circuit.

The ASIC may further include a plurality of switching units connected via output terminals to each of the plurality of brushless DC motors, respectively, and the at least one switching unit of the plurality of switching units may receive the operation command from the operation control unit and outputs via the output terminals driving signals to drive at least one brushless DC motor of the plurality of brushless DC motors.

Features and/or utilities of the present general inventive concept may also be realized by a n image-forming apparatus including an image-forming engine to form an image on a recording medium, a plurality of brushless DC motors to supply power to components of the image-forming engine, and a motor control apparatus to control the plurality of brushless DC motors. The motor control apparatus may include a communication interface to receive a control signal and to extract destination data from the control signal and at least one operation control unit to receive the control signal from the communication interface and to output an operation command to at least one brushless DC motor of the plurality of brushless DC motors capable of receiving operation commands from the at least one operation control unit. The at least one operation control unit may correspond to the destination data extracted from the control signal by the communication interface.

Features and/or utilities of the present general inventive concept may also be realized by a method of controlling a plurality of brushless DC motors, the method including receiving an input control signal corresponding to at least one of the plurality of brushless DC motors, determining the at least one of the plurality of brushless DC motors that corresponds to the input control signal, and generating a brushless DC motor control signal to control operation of the at least one of the plurality of brushless DC motors based on the determination.

Generating the brushless DC motor control signal may include outputting the same brushless DC motor control signal simultaneously to a plurality of the brushless DC motors.

Alternatively, generating the brushless DC motor control signal may include generating a plurality of different brushless DC motor control signals and simultaneously outputting the different brushless DC motor control signal to different brushless DC motors of the plurality of brushless DC motors.

BRIEF DESCRIPTION OF THE DRAWINGS

These and/or other aspects and utilities of the present general inventive will become apparent and more readily appreciated from the following description of the embodiments, taken in conjunction with the accompanying drawings of which:

FIG. 1B is a block diagram a configuration of a motor control apparatus according to an exemplary embodiment of the present general inventive concept;

DETAILED DESCRIPTION OF THE EMBODIMENTS

Figure 1A:
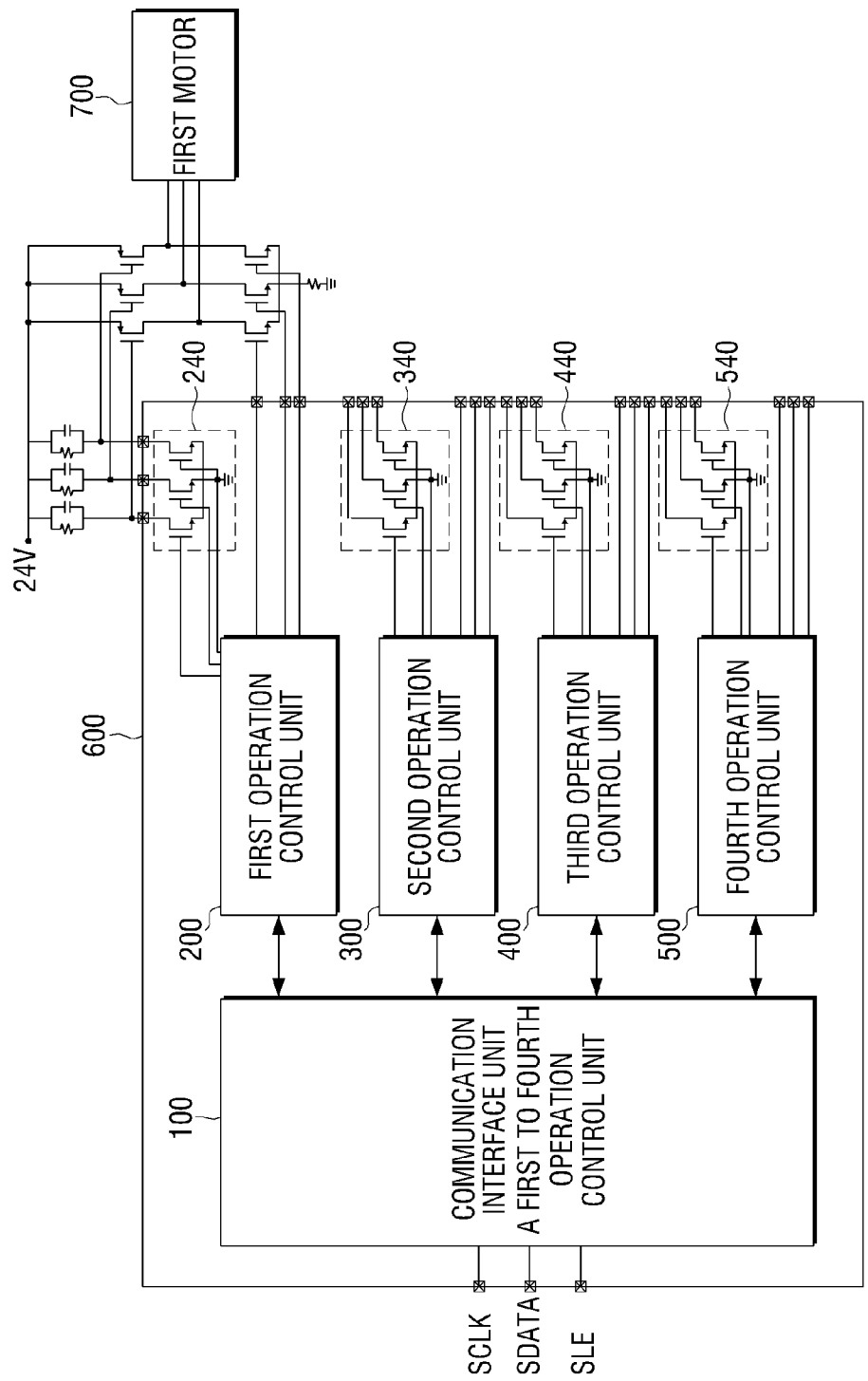
FIG. 1A is a schematic diagram illustrating a configuration of a motor control apparatus according to an exemplary embodiment of the present general inventive concept.

Reference will now be made in detail to the present embodiments of the present general inventive concept, examples of which are illustrated in the accompanying drawings, wherein like reference numerals refer to like elements throughout. The embodiments are described below in order to explain the present general inventive concept by referring to the figures.

FIG. 1A is a schematic diagram illustrating a configuration of a motor control apparatus 600 according to an exemplary embodiment of the present general inventive concept.

As illustrated in FIG. 1A, the motor control apparatus 600 may include a communication interface unit 100, a first to fourth operation control unit 200, 300, 400 and 500, and a first to fourth switching assistant unit 240, 340, 440 and 540, all of which are incorporated into a single application-specific integrated circuit (ASIC) chip. In FIG. 1A, for description of convenience, only the first motor 700 is connected to the first switching assistant unit 240, but respective motors may be connected to the second to fourth switching assistant unit 340 to 540.

The communication interface unit 100 receives a digital control command for a plurality of brushless direct current (BLDC, or brushless DC) motors. More specifically, the communication interface unit 100 receives a digital control command to control the operation of the brushless DC motors from an engine control unit. A digital control command may include information regarding start/stop of rotation, acceleration/reduction, direction of rotation, rotation speed, and operation of a brake for the brushless DC motors. Such a digital control command may be received from the engine control unit through a universal asynchronous receiver/transmitter (UART), a Serial Peripheral Interface (SPI) which enables exchange of data through serial communication between two devices, or a serial communications interface (SCI) such as an Inter-Integrated Circuit (I²C) which is a two-way serial bus.

The communication interface unit 100 reads out a control signal from the received digital control command, and distributes the read-out control signal to a channel corresponding to the received digital control command (the first to fourth operation control unit 200 to 500). The control signal may include channel information to control a motor that corresponds to a particular channel. More specifically, the communication interface unit 100 reads out channel information and diverse operating commands for the motors to be transmitted to a corresponding channel (for example, start/stop of rotation, acceleration/reduction, direction of rotation, rotation speed, and operation of a brake for the motors) from the digital control command received through the Serial peripheral Interface Bus an SCLK, SDATA, or SLE terminal, and transmits the extracted control signal to an operation control unit (the first to fourth operation control unit 200 to 500) of the corresponding channel.

The communication interface unit 100 may also transmit information regarding the state of the plurality of motors to the engine control unit. More specifically, the communication interface unit 100 may transmit information regarding the preparation state of channels, temperature of channels, and an overcurrent of channels to the engine control unit. For example, while controlling a motor, if overcurrent is sensed for a specific brushless DC motor, the communication interface unit 100 notifies the engine control unit of occurrence of overcurrent to so that the engine control unit can protect the motor.

The communication interface unit 100 may receive not only digital control information regarding control of motor, but also information regarding a control method of the motor control apparatus 600. More specifically, the communication interface unit 100 may receive information regarding a control method of the motor control apparatus 600 such as a pulse-width modulation (PWM) frequency, duty ratio of channels, discriminator division ratio of channels, phase-locked loop (PLL) application of channels, and shutdown time of channels, and control the plurality of motors based on the received information regarding the control method of the motor control apparatus 600.

The first to fourth operation control units 200 to 500 may have the same configuration and function, and may control the brushless DC motors according to a control signal received from the communication interface unit 100. In this exemplary embodiment of the present general inventive concept, a single operation control unit controls a single brushless DC motor, but a single operation control unit may control two brushless DC motors or may control four brushless DC motors. Furthermore, in this exemplary embodiment of the present general inventive concept, the four operation control units control the brushless DC motors, but some of the four operation control units may control a standard DC motor or a step motor. A detailed configuration and function of the operation control units are described below with reference to FIG. 2.

The first to fourth switching assistant units 240 to 540 are connected to the motors respectively and transmit an operation signal output by the first to fourth operation control unit 200 to 500 to the motors respectively. More specifically, to control a brushless DC motor, the power should be applied to each phase of the brushless DC motor. Accordingly, the first to fourth switching assistant unit 240 to 540 each include switch elements corresponding to the number of phases of the brushless DC motor, and the switch elements are sequentially switched on or off according to the operation signal received from the first to fourth operation control unit 200 to 500. Therefore, as the switch elements are sequentially switched on or off, the first brushless DC motor 700 receives 3-phase power which is sequentially switched on or off. In this exemplary embodiment of the present general inventive concept, the first to fourth switching assistant units 240 to 540 are provided separately from the first to fourth operation control units 200 to 500, but the first to fourth switching assistant units 240 to 540 may be included in the first to fourth operation control units 200 to 500, respectively.

The first to fourth switching assistant units 240 to 540 may be integrated into an ASIC chip together with the communication interface unit 100 and the first to fourth operation control units 200 to 500. As described above, the motor control apparatus 600 can control output of four or more channels using a single ASIC chip and can thus easily control the plurality of brushless DC motors.

In FIG. 1A, the motor control apparatus 600 may represent a single ASIC chip to control a plurality of motors 700. FIG. 1B illustrates a block diagram of a motor control apparatus 601 in which the switching units are not integrated in the same ASIC chip as the communication interface and operation control units.

As illustrated in FIG. 1B, an ASIC chip 602 may include circuitry that functions as a communication interface 100 and a plurality of operation control units 200, 300, and 400 to control a respective plurality of brushless motors 700a-700c. The communication interface may receive inputs from three input terminals T1-T3 corresponding to an SCLK signal, an SDATA signal, and an SLE signal, respectively. The SCLK signal, the SDATA signal, and the SLE signal may together comprise control data to control the plurality of motors 700a-700c. Output terminals T5, T7, and T9 of the ASIC chip 602 may be connected to respective switching units 240, 340, and 440. As illustrated in FIG. 1A, each terminal T5, T7, and T9 may each include a plurality of terminals. The respective switching units 240, 340, and 440 may be part of a single chip or may be separate chips.

As described above, the switching units 240, 340, and 440 control power supplied to the brushless motors 700a-700c, respectively, to control operation of the brushless motors 700a-700c. The brushless motors 700a-700c may output feedback signals FB to the operation control units 200, 300, and 400 via the terminals T6, T8, and T10. As illustrated in FIG. 1A, each of the feedback terminals T6, T8, and T10 may include a plurality of terminals.

The feedback signals FB may be processed by the operation control units 200, 300, and 400, or may be directly input to the communication interface 100 to be transmitted to an engine control unit (not shown in FIG. 1B).

Referring again to FIG. 1A, the first motor 700 is a brushless DC motor provided in an image forming apparatus, which receives 3-phase power sequentially input according to a switching operation of the first switching assistant unit 240 and may perform uniform or accelerated motion according to the input 3-phase power. In addition, the first motor 700 may perform forward or reverse operation according to the phase order of the input 3-phase power. In FIG. 1A, only the first motor 700 is illustrated for convenience of description, but brushless DC motors may be connected to the second to fourth switching assistant unit 340 to 540, respectively.

The first motor 700 may include a brake and may perform a brake operation according to the operation of the motor control apparatus 600.

The first motor 700 may further include a Hall sensor to sense a rotor's position in the first motor 700, and a speed sensor to sense the rotation speed. More specifically, the Hall sensor is a sensor which is attached to a brushless DC motor and senses a rotor's position in the brushless DC motor. The speed sensor is a sensor which outputs the operation speed of a brushless DC motor in a frequency format. Information regarding the rotor's position and the operation speed sensed by the Hall sensor and the speed sensor are transmitted to the first operation control unit 200. The first operation control unit 200 performs feedback control of the first motor 700 based on the received information. In this exemplary embodiment of the present general inventive concept, the Hall sensor and the speed sensor are described, but other sensors may be used to sense the operation of the motors.

Under this configuration, the motor control apparatus 600 can control the plurality of brushless DC motors connected to the respective channels according to a digital control command transmitted from the engine control unit.

In FIG. 1A, the motor control apparatus 600 controls the four channels, but may control more than four channels, and may control a DC motor or a step motor other than a brushless DC motor for some of the plurality of channels. The motor control apparatus 600 may control the four channels individually or in the same manner.

Figure 2:
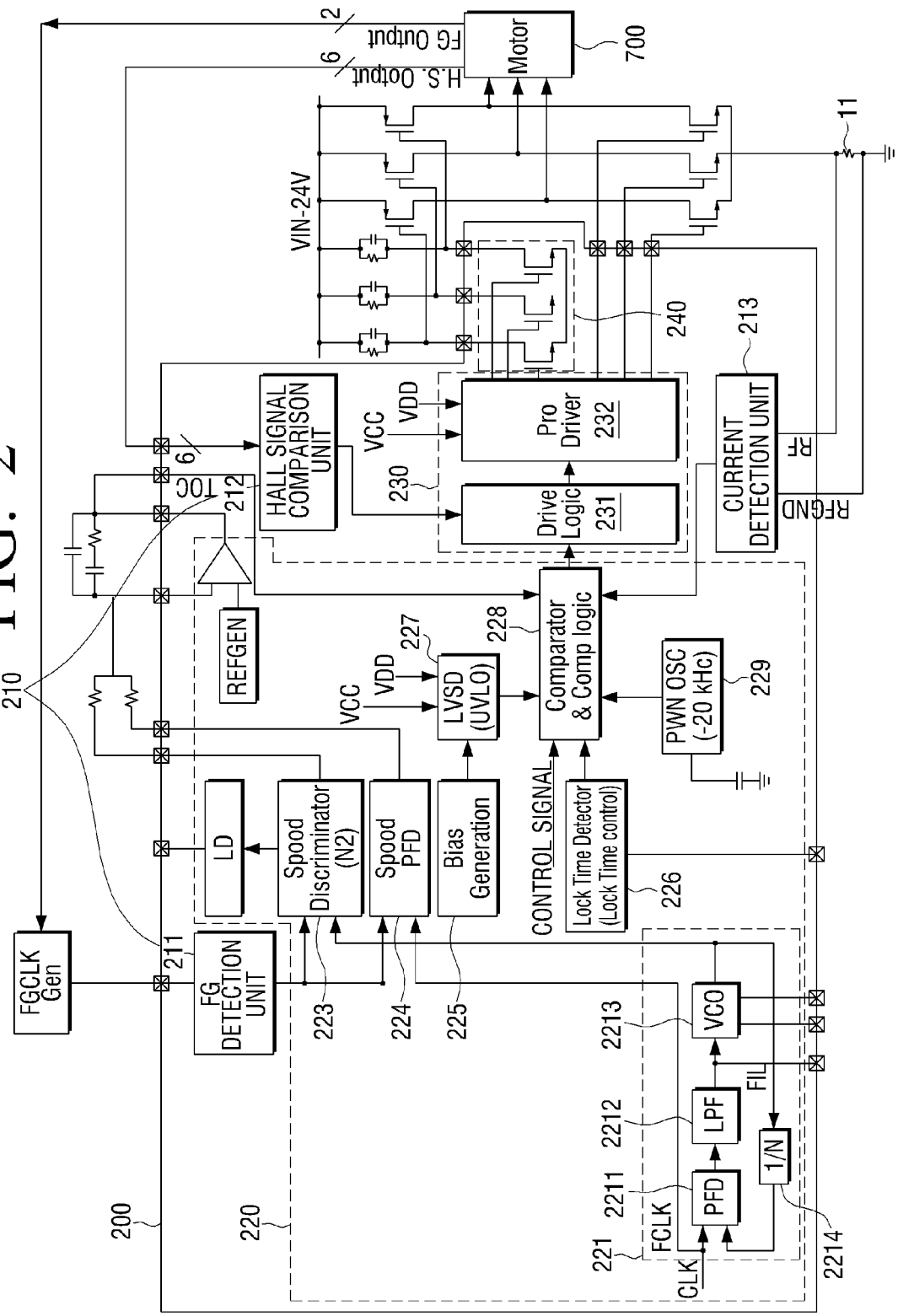
FIG. 2 is a detailed diagram illustrating a configuration of a operation control unit shown in FIG. 1.

FIG. 2 is a detailed diagram illustrating a configuration of an operation control unit shown in FIG. 1A.

Referring to FIG. 2, the operation control unit 200 may include a sensor unit 210, a speed control unit 220, an operation signal unit 230, and a switching assistant unit 240.

The sensor unit 210 senses operation information of the brushless DC motor 700. More specifically, the sensor unit 210 may include a Hall signal comparison unit 212 (referred to hereinafter as "rotor position sensing unit"), a Generated Frequency (FG) detection unit 211 (referred to hereinafter as "speed sensing unit"), and a current detection unit 213.

The rotor position sensing unit 212 receives information regarding the rotor's position from the Hall sensor attached to the brushless DC motor 700 and transmits the received information to the speed control unit 220 or the operation signal unit 230.

The speed sensing unit 211 receives information regarding the rotation speed of the brushless DC motor 700 from the speed sensor attached to the brushless DC motor 700 in a frequency format and transmits the received information to the speed control unit 220. In this exemplary embodiment of the present general inventive concept, the rotation speed is sensed using the speed sensor attached to the brushless DC motor 700, but it may be possible to measure the speed of the brushless DC motor 700 using the rotor's position transmitted from the Hall sensor.

The current detection unit 213 senses the strength of the current input to the first motor 700. More specifically, the current detection unit 213 may sense the strength of the current input to the first motor 700 by measuring the voltage of both ends of a resistor 11 as illustrated in FIG. 2. If the sensed strength of the current is greater than a preset value, the current detection unit 213 transmits the sensed strength of the current to the speed control unit 220. Accordingly, if the overcurrent is input to the first motor 700, the current detection unit 213 stops operation of the first motor 700 to protect the first motor 700. It may be possible that the current detection unit 213 only senses the strength of the current input to the first motor 700 and the speed control unit 220 determines whether or not overcurrent is input to the first motor 700 and protects the first motor 700.

The speed control unit 220 controls an operation signal of the operation signal unit 230 according to a received digital control command. More specifically, the speed control unit 220 receives a control signal from the communication interface unit 100 and controls the operation signal unit 230 to operate the first motor 700 according to the control signal. For example, if the speed control unit 220 receives a control signal for a specific channel (for example, start of rotation, acceleration, forward direction, and a specific rotation speed) from the communication interface unit 100, the speed control unit 220 controls the operation signal unit 230 to operate the first motor 700 according to the received control signal.

The speed control unit 220 may include a frequency divider 221 and may perform feedback control by comparing the information regarding the rotation speed received from the speed sensing unit 211 with the frequency of the frequency divider 221. The frequency divider 221 generates a frequency corresponding to information regarding the rotation speed contained in the control signal received from the communication interface unit 110.

The operation signal unit 230 generates an operation signal for the first motor 700. More specifically, the operation signal unit 230 generates a 3-phase operation signal based on control of the speed control unit 220 and information regarding the rotor's position from the rotation position sensing unit 212.

If the received control signal is related to brake operation, the operation signal unit 230 transmits a signal to operate the brake to the first motor 700.

The switching assistant unit 240 switches on or off a switching element according to an operation signal output from the operation signal unit 230. Since a switching element which is connected to each phase of the first motor 700 is switched on or off according to a switching signal generated by the operation signal unit 230, the power to be input to each phase of the first motor 700 may be controlled, so operation of the first motor 700 may be controlled.

In FIG. 2, a single operation control unit controls a single brushless DC motor, but a single operation control unit may control two or more brushless DC motors. Furthermore, a single operation control unit may control a DC motor or a step motor together with a brushless DC motor.

Figure 3:
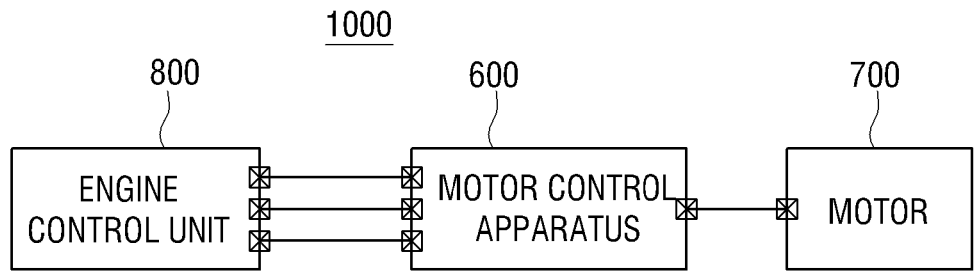
FIG. 3 illustrates contact relationship between a motor control apparatus, a control unit and a program device according to an exemplary embodiment of the present general inventive concept.

FIG. 3 illustrates a configuration of an image forming apparatus according to an exemplary embodiment of the present general inventive concept.

Referring to FIG. 3, the image forming apparatus 1000 may include a motor control apparatus 600 and an engine control unit 800.

The engine control unit 800 controls operation of an engine unit (not shown) which is used to perform an image forming job, and transmits a digital control command for a plurality of brushless DC motors to operate the engine unit (not shown) to the motor control apparatus 600. More specifically, if a printing job is input, the engine control unit 800 controls the engine unit (not shown) to perform the printing job, and transmits a digital control command to the motor control apparatus 600 so as to operate the plurality of brushless DC motors which operate the engine unit (not shown).

For example, the engine control unit 800 may transmit a digital control command related to operation of the plurality of brushless DC motors and a command related to a specific control method of the motor control apparatus 600, such as 'motor operation,' 'PWM Frequency Control,' 'PWM Max Duty Control,' 'PLL Divider Control,' 'PLL Bypass Control' and 'Lock Time Control.' The 'motor operation' is a digital control command for channels related to operation of the motors. The 'PWM Frequency Control' is a PWM frequency control command in the motor control apparatus 600. The 'PWM Max Duty Control' is a control command of max duty ratio for channels. The 'PLL Divider Control' is a control command of discriminator division ratio of channels in the motor control apparatus 600. The 'PLL Bypass Control' is a control command related to PLL operation for channels. The 'Lock Time Control' is a control command related to shutdown time of channels.

The engine control unit 800 receives state information of channels in the motor control apparatus 600, such as 'Motor Operation State' and 'Protection State,' from the motor control apparatus 600. The 'Motor Operation State' is information reporting preparation state and lock state of channels. The 'Protection State' is information reporting the temperature of the motor control apparatus 600 and overcurrent of channels.

The motor control apparatus 600 receives a digital control command for the plurality of brushless DC motors from the engine control unit 800, and generates an operation signal for the plurality of brushless DC motors. Since detailed configuration and operation of the motor control apparatus 600 has been described above with reference to FIGS. 1A, 1B, and 2, detailed description is not repeated.

As described above, the motor control apparatus 600 may receive digital control information from the engine control unit 800 through three input terminals, that is, SCLK, SDATA and SLE. Since the engine control unit 800 may transmit a control command for the plurality of brushless DC motors using only the three terminals, the use of resource in the engine control unit 800 may be reduced.

In addition, since the motor control apparatus 600 may be connected to the engine control unit 800 through the three terminals, circuit design for the image forming apparatus may be facilitated.

Furthermore, since the motor control apparatus 600 may be implemented using a single ASIC chip, a circuit for the image forming apparatus may be simplified.

Figure 4:
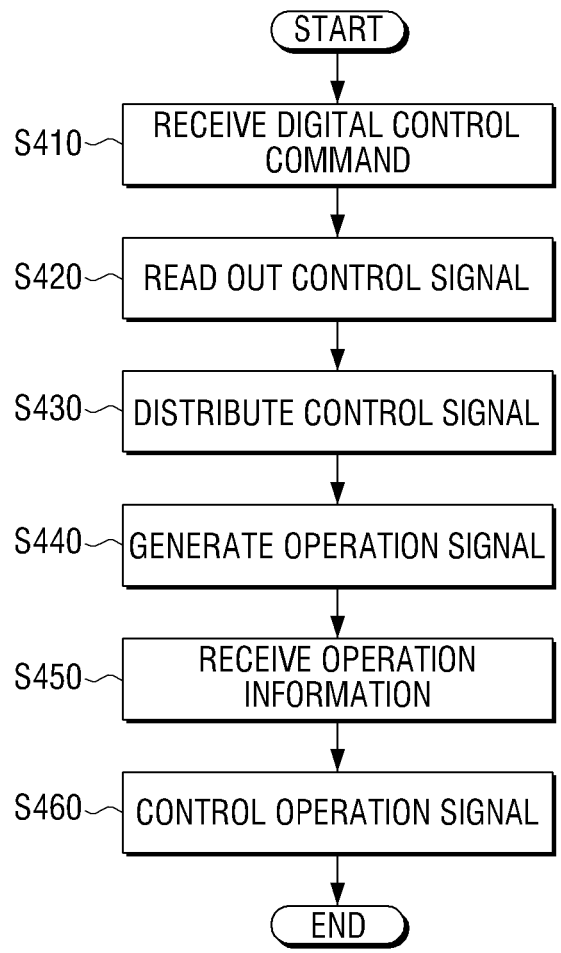
FIG. 4 is a flow chart illustrating a motor control method according to an exemplary embodiment of the present general inventive concept.

FIG. 4 is a flow chart illustrating a motor control method according to an exemplary embodiment of the present general inventive concept.

Referring to FIG. 4, in operation S410 if a digital control command for a plurality of brushless DC motors is received, in operation S420 a control signal is read out from the received digital control command. More specifically, if a digital control command is received through a UART which is a universal asynchronous transmission and reception method, a SPI which enables exchange of data through serial communication between two devices, or an SCI such as an Inter-Integrated Circuit ($I^2C$) which is a two-way serial bus, channel information and diverse control signals for a motor to be transmitted to a corresponding channel are read out or extracted from the digital control command. A control signal may include information regarding start/stop of rotation, acceleration/reduction, direction of rotation, rotation speed, and operation of a brake for a brushless DC motor.

Subsequently, in operation S430, the read-out control signal is distributed to a corresponding channel. More specifically, the read-out control signal is distributed to a corresponding channel using the channel information read out from the digital control command.

In operation S440, an operation signal for the plurality of brushless DC motors is generated according to the control signal so that a brushless DC motor corresponding to each channel may be controlled. According to a method for controlling the plurality of brushless DC motors, the operation signal may vary according to each channel or may be the same for the channels. The operation signal may be intended for the brushless DC motors or for a step motor or a DC motor according to a kind of connected motor.

In operation S450 operation information generated according to operation of the brushless DC motors is received, and in operation S460 feedback control for the operation signal is performed based on the operation information. The operation information may include information regarding a rotor's position for each brushless DC motor and information regarding the rotation speed for each brushless DC motor. More specifically, the operation information may be information regarding a rotor's position from the Hall sensor attached to the brushless DC motor or information regarding the rotation speed in a frequency format from the speed sensor attached to the brushless DC motor, so feedback control for an operation signal generated according to operation information can be performed.

The above operations S410 to S460 may be performed in a single ASIC chip. In a single ASIC chip, controlling output to four or more channels is enabled, so a tandem-type color laser beam printer (LBP) as well as mono LBP can be controlled using a single ASIC chip. The motor control method shown in FIG. 4 is executed by a motor control apparatus having a configuration shown in FIG. 1A, and may be executed by motor control apparatus having different configurations.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
   an engine unit to perform an image forming operation;
   an engine control unit to control operation of the engine unit;
   a plurality of brushless direct current (BLDC) motors to operate the engine unit;
   a communication interface unit to receive a digital control command for the plurality of brushless DC motors from the engine control unit, wherein the digital control command includes destination data and control signals related to the destination data corresponding to the plurality of brushless DC motors;
   a sensor unit to sense operation information of the plurality of brushless DC motors;
   an operation signal unit to generate an operation signal to control the plurality of brushless DC motors; and
   a speed control unit to control the operation signal unit according to the received digital control command and sensing result of the sensor unit.

2. A motor control apparatus, comprising:
   a plurality of brushless direct current (BLDC) motors;
   a communication interface unit to receive a digital control command extract destination corresponding data to the plurality of brushless DC motors; and
   an operation control unit to control the plurality of brushless DC motors according to the received digital control command,
   wherein the operation control unit receives a control signal according to the extracted destination data from the communication interface and outputs the control signal to the corresponding brushless DC motor of the plurality of brushless DC motors each capable of receiving the control signal from the operation control unit.

3. The motor control apparatus according to claim 2, wherein the operation control unit comprises:
   an operation signal unit to generate an operation signal to control the plurality of brushless DC motors; and
   a speed control unit to control the operation signal unit according to the received digital control command.

4. The motor control apparatus according to claim 3, wherein the operation control unit further comprises a sensor unit to sense operation information of each of the brushless DC motors, and
   the speed control unit receives the operation information and performs feedback control according to the operation information.

5. The motor control apparatus according to claim 4, wherein the sensor unit comprises:
   a rotor position sensing unit to receive information regarding a rotor's position from a Hall sensor attached to each of the brushless DC motors; and
   a speed sensor unit to receive information regarding a rotation speed of each of the brushless DC motors.

6. The motor control apparatus according to claim 2, wherein the operation control unit controls the brushless DC motors individually.

7. The motor control apparatus according to claim 2, wherein the operation control unit controls each of the brushless DC motors with the same control signals.

8. The motor control apparatus according to claim 2, wherein the communication interface unit receives the digital control command through a Serial Peripheral Interface (SPI), a universal asynchronous receiver/transmitter (UART), or an Inter-Integrated Circuit ($I^2C$).

9. The motor control apparatus according to claim 2, wherein the digital control command includes information regarding start/stop of rotation, acceleration/reduction, direction of rotation, rotation speed, or operation of a brake for the brushless DC motors.

10. The motor control apparatus according to claim 2, wherein the operation control unit includes a plurality of operation control units corresponding to the plurality of brushless DC motors, respectively, and the communication interface unit transmits the digital control command to a corresponding one of the plurality of operation control units.

11. The motor control apparatus according to claim 2, further comprising:
    a step motor; and
    a direct current (DC) motor,
    wherein the operation control unit controls the plurality of brushless DC motors and at least one of the step motor and the DC motor.

12. The motor control apparatus according to claim 2, wherein the communication interface unit and the operation control unit are integrated into a single chip.

13. A method for controlling a plurality of brushless direct current (BLDC) motors in an image forming apparatus, the method comprising:
    receiving a digital control command and extracting destination data to correspond to the plurality of brushless DC motors;
    reading out a control signal corresponding to the respective brushless DC motor from the extracted destination data of the received digital control command; and
    generating an operation signal to control the plurality of brushless DC motors according to the read-out control signal.

14. The method according to claim 13, further comprising:
    receiving operation information of each of the brushless DC motors; and
    controlling the operation signal according to the operation information.

15. The method according to claim 14, wherein the operation information is at least one of information regarding a rotor's position of each of the brushless DC motors, and information regarding a rotation speed of each of the brushless DC motors.

16. The method according to claim 13, wherein in the generating of the operation signal, a different operation signal is generated for each of the brushless DC motors.

17. The method according to claim 13, wherein in the generating of the operation signal, the same operation signal is generated for the plurality of brushless DC motors.

18. The method according to claim 13, wherein in the generating of the operation signal, the operation signal is generated for the plurality of brushless DC motors, and for at least one of a step motor and a direct current (DC) motor.

19. An image-forming apparatus, comprising:
    an image-forming engine to form an image on a recording medium;
    a plurality of brushless DC motors to supply power to components of the image-forming engine; and a motor control apparatus to control the plurality of brushless DC motors, the motor control apparatus comprising:

a communication interface to receive a control signal and to extract destination data from the control signal; and at least one operation control unit to receive the control signal from the communication interface and to output an operation command to at least one brushless DC motor of the plurality of brushless DC motors capable of receiving operation commands from the at least one operation control unit, wherein the at least one operation control unit corresponds to the destination data extracted from the control signal by the communication interface.

20. The image-forming apparatus according to claim 19, wherein the at least one operation control unit includes a plurality of operation control units, each operation control unit corresponding to at least one respective brushless DC motor.

21. The image-forming apparatus according to claim 19, wherein the at least one operation control unit comprises:

an operation signal unit to generate the operation command to control the plurality of brushless DC motors; and a speed control unit to receive the control signal from the communication interface and to control the operation signal unit according to the received control signal.

22. The image-forming apparatus according to claim 19, wherein the motor control apparatus further comprises:

a plurality of switching units to correspond to the plurality of brushless DC motors, respectively, wherein the at least one switching unit of the plurality of switching units receives the operation command from the operation control unit and outputs driving signals to drive at least one brushless DC motor of the plurality of brushless DC motors.

23. The image-forming apparatus according to claim 22, wherein the operation command includes a plurality of operation commands corresponding to the plurality of brushless DC motors, and each switching unit receives a different one of the plurality of operation commands and outputs different driving signals to the plurality of brushless DC motors, respectively, corresponding to the different operation commands.

24. The image-forming apparatus according to claim 19, wherein the motor control apparatus further comprises:

a feedback circuit to sense operation information of each of the brushless DC motors, wherein the at least one operation control unit receives the operation information from each of the brushless DC motors and adjusts the output operation command accordingly.

* * * * *